United States Patent
Nishiji et al.

(10) Patent No.: US 6,866,607 B2
(45) Date of Patent: Mar. 15, 2005

(54) PLANETARY GEAR DEVICE

(75) Inventors: Makoto Nishiji, Saitama (JP);
Shinichiro Nakajima, Auderghem (BE); Akinao Minegishi, Tsesaki (JP)

(73) Assignee: Bosch Automotive Systems Corporation, Tokyo (JP)

( * ) Notice: Subject to any disclaimer, the term of this patent is extended or adjusted under 35 U.S.C. 154(b) by 0 days.

(21) Appl. No.: 10/229,724

(22) Filed: Aug. 28, 2002

(65) Prior Publication Data

US 2003/0050146 A1 Mar. 13, 2003

(30) Foreign Application Priority Data

Sep. 11, 2001 (JP) ........................................ 2001-274808

(51) Int. Cl.$^7$ ............................................. F16H 57/08
(52) U.S. Cl. ...................................................... 475/331
(58) Field of Search ................................ 475/331, 248, 475/249

(56) References Cited

U.S. PATENT DOCUMENTS 5,785,624 A * 7/1998 Mayr ......................... 475/252
5,863,272 A * 1/1999 Anderson ................... 475/331
6,080,076 A * 6/2000 Kwoka et al. ............... 475/160
6,325,738 B1 * 12/2001 Caringella et al. .......... 475/249

FOREIGN PATENT DOCUMENTS

| DE | 19713976 A1 | * 11/1997 |
|---|---|---|
| JP | 09-112657 | 5/1997 |
| JP | 09-144844 | 6/1997 |
| JP | 09-280338 | 10/1997 |

\* cited by examiner

*Primary Examiner*—Sherry Estremsky
(74) *Attorney, Agent, or Firm*—Thomas B. Ryan; Brian B. Shaw, Esq.; Harter, Secrest & Emery LLP (57) ABSTRACT

A receiving portion 2e for rotatably receiving therein a planetary gear 3, is formed between a plurality of retaining protrusions 2d of a carrier. A connection portion 2f extending annularly about a rotation axis L is formed on an outer peripheral of a distal end portion of each retaining protrusion 2d. Through this connection portion 2f, the distal end portions of the respective retaining protrusions 2d are connected to each other. Owing to this arrangement, each retaining protrusion 2d is reinforced to minimize its deformation. As a result, deformation of the receiving portion 2e is greatly reduced and the planetary gear 3 receiving in the receiving portion 2e can rotate smoothly.

7 Claims, 12 Drawing Sheets

PLANETARY GEAR DEVICE

BACKGROUND OF THE INVENTION

The present invention relates to a planetary gear device in which planetary gears are received in receiving portions formed in a carrier such that planetary gears can rotate about their own axes.

In general, a planetary gear device includes an inner gear, a sun gear and a carrier whose axes are aligned with a rotation axis. A plurality of retaining protrusions are formed on the carrier. The respective retaining protrusions extend in parallel with the rotation axis of the planetary gear device and are arranged on a circumference about the rotation axis in such a manner as to be away from each other. A receiving portion is formed between retaining protrusions which are adjacent to each other in the circumferential direction. A planetary gear is received in each receiving portion such that the planetary gear can rotate about its own axis. Each planetary gear is in meshing engagement with the inner gear and the sun gear. (see Japanese Patent Application Laid-Open Nos. H09-112657 and H09-144844)

In the conventional planetary gear device, each retaining protrusion is held in a cantilever fashion. For this reason, the retaining protrusions are low in strength and their distal end portions are readily deformed in a circumferential direction and in a radial direction. Accordingly, when force acts on the planetary gears in a circumferential direction and/or in a radial direction about the rotation axis at the time of differential rotation of the planetary gear device, the respective retaining protrusions are deformed and the respective receiving portions are readily deformed in accordance with deformation of the respective retaining protrusions. As a result, the planetary gears received in the receiving portions become unable to rotate smoothly. This results in a problem that the smooth rotation of the entire planetary gear device is prohibited.

SUMMARY OF THE INVENTION

The present invention has been accomplished in order to solve the above-mentioned problem. The features of the present invention reside in a planetary gear device comprising an inner gear, a carrier and a sun gear whose axes are aligned with a rotation axis, the carrier including a basal portion and a plurality of retaining protrusions extending in parallel with the rotation axis from an end face of the basal portion orientating in a direction of the rotation axis and formed on a circumference about the rotation axis in such a manner as to be away from each other, a receiving portion being formed between adjacent the retaining protrusions in the circumferential direction and adapted to received therein a planetary gear which is in meshing engagement with the inner gear and the sun gear such that the planetary gear can rotate about its own axis, wherein distal end portions of adjacent the retaining protrusions in the circumferential direction about the rotation axis are connected to each other.

It is preferred that the distal end portions of the retaining protrusions are connected to each other through a connection portion which is integral with the respective distal end portions. It is also preferred that the connection portion is arranged in such a manner as to contact an end face of the planetary gear on the distal end side of the retaining protrusion, and the receiving portion includes a through hole extending all the way through the basal portion and for allowing the planetary gear to be inserted therein.

Preferably, the inner gear, the sun gear and the planetary gear have twisted teeth.

It is preferred that the retaining protrusions are connected to each other by fitting an annular connection member, which is separately formed from the retaining protrusions, to distal end portions of the retaining protrusions.

It is also preferred that the inner gear, the sun gear and the planetary gear include twisted teeth, and the connection member is arranged in such a manner as to contact an end face of the planetary gear on a distal end side of the retaining protrusion.

DETAILED DESCRIPTION OF THE INVENTION

Several embodiments of the present invention will now be described with reference to FIGS. 1 through 13.

Figure 1:
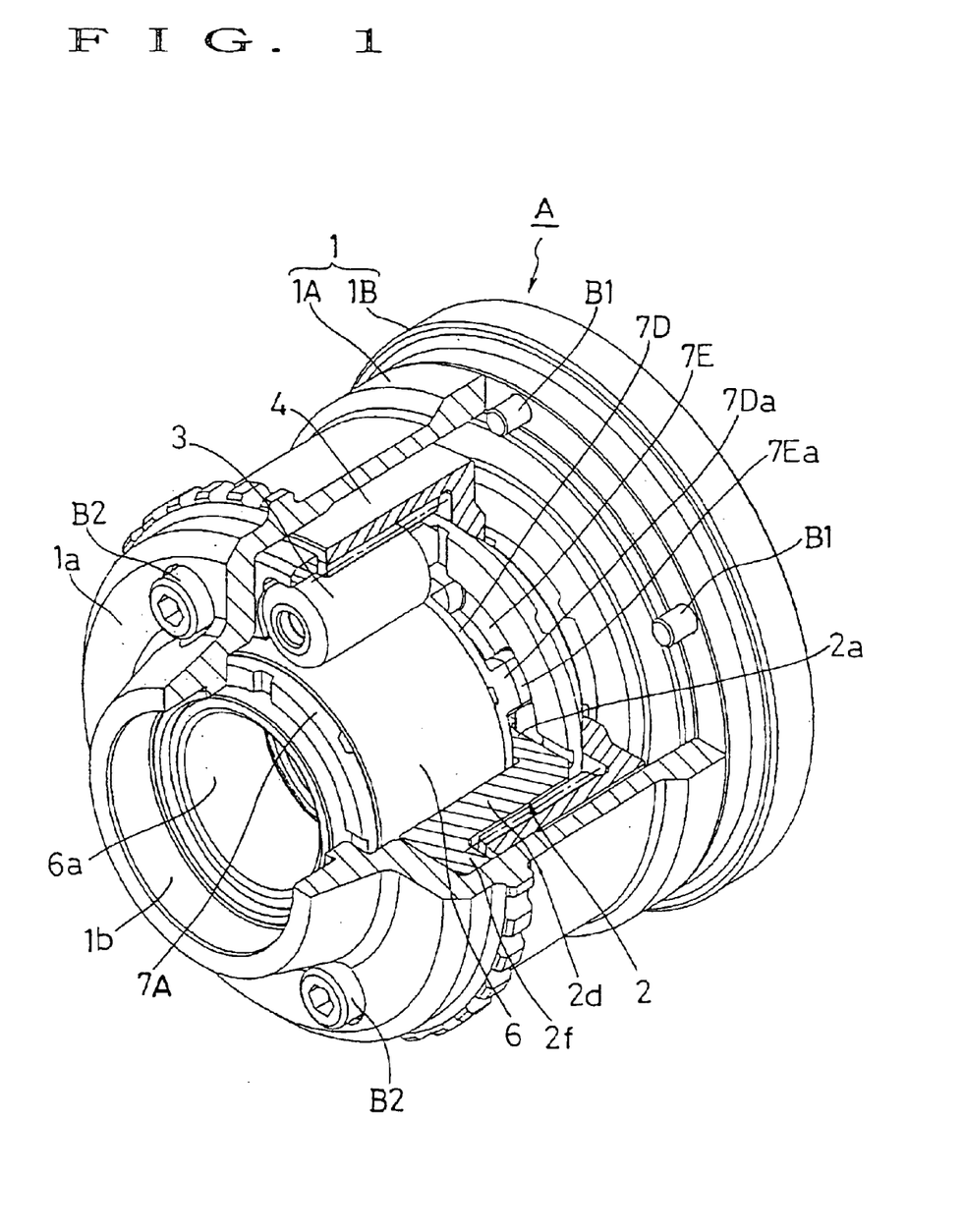
FIG. 1 is a perspective view, partly cut-away, showing a first embodiment.
Figure 2:
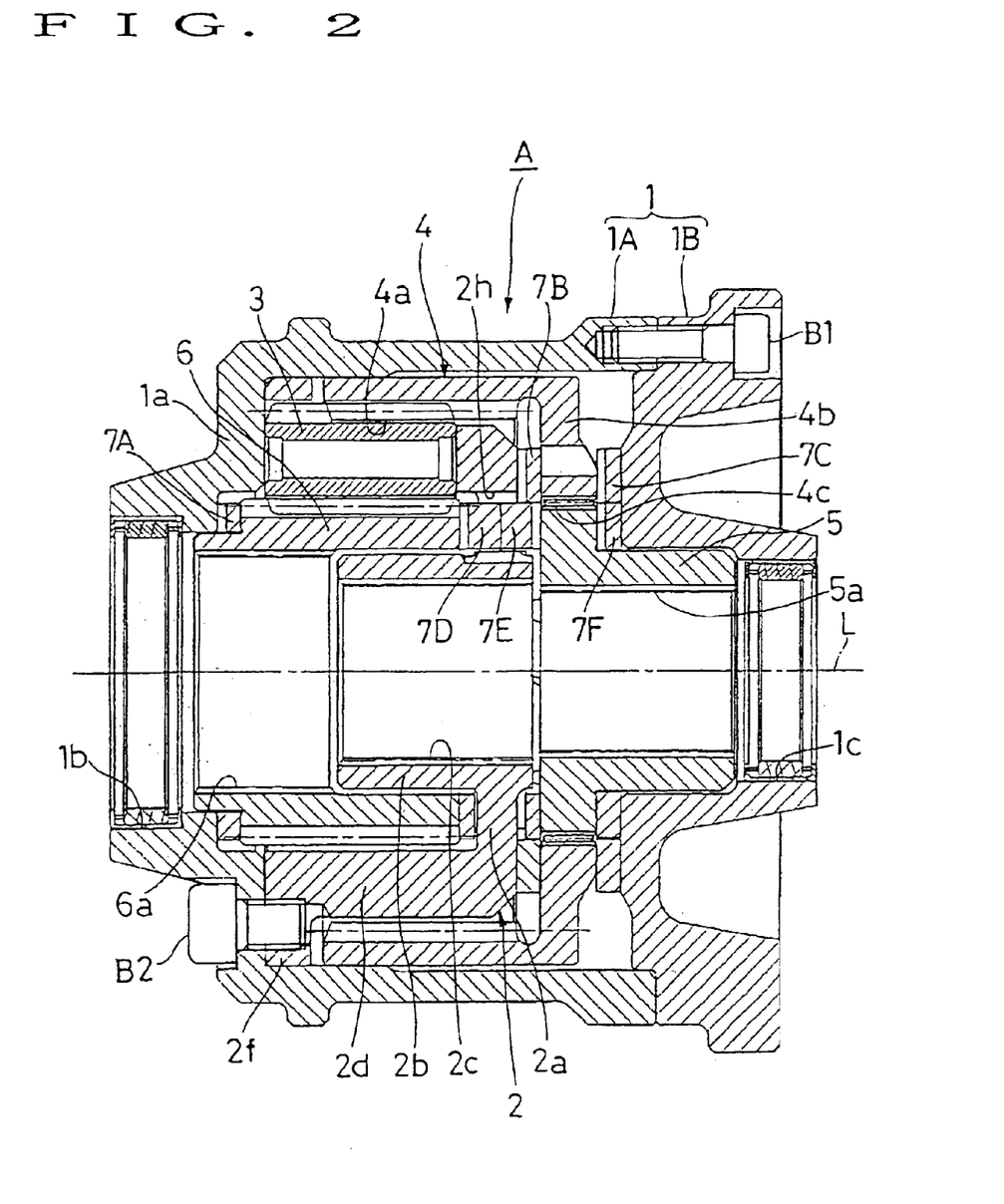
FIG. 2 is a vertical sectional view of the above embodiment.
Figure 3:
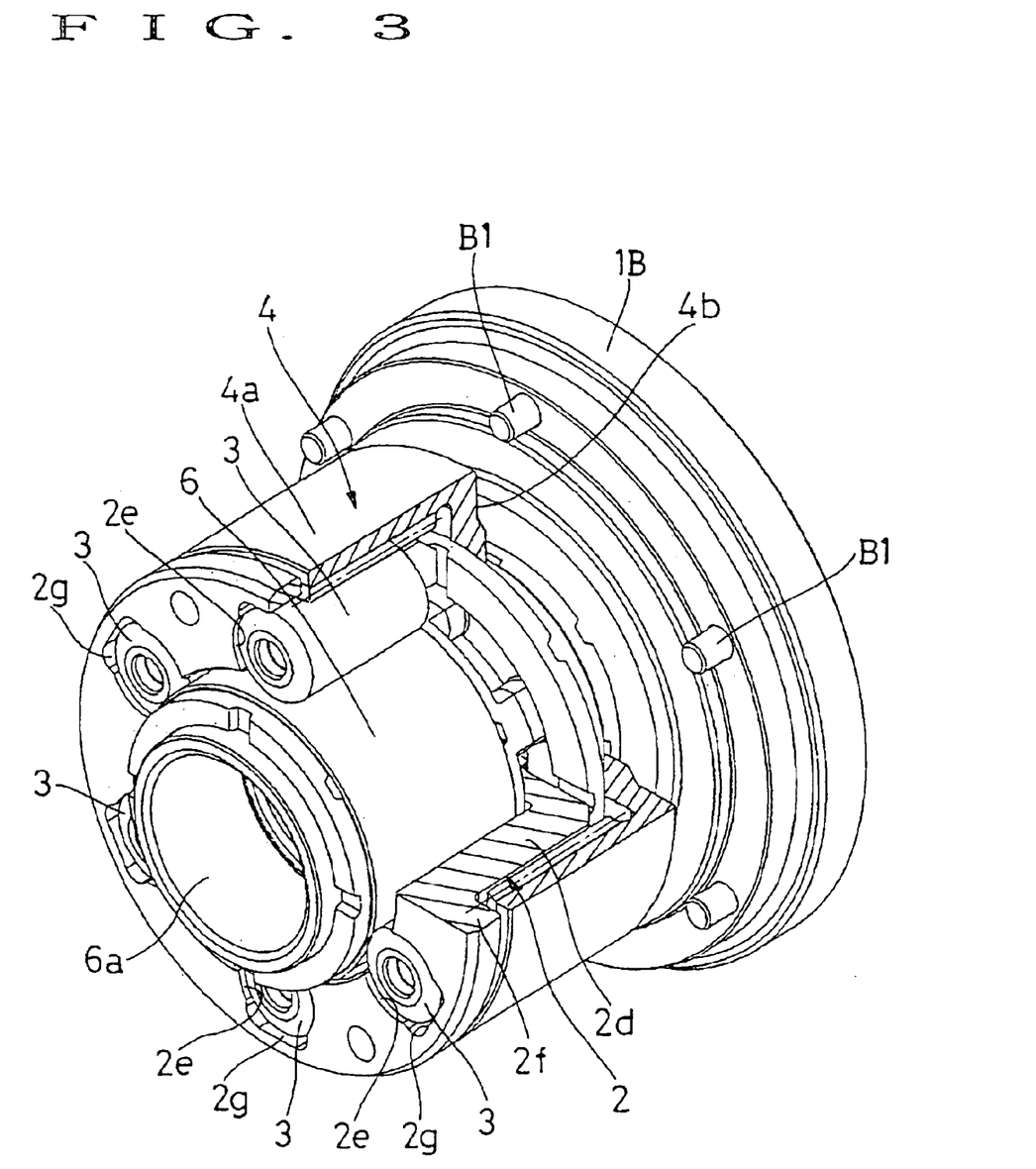
FIG. 3 is a perspective view, partly cut-away, showing the above embodiment but in which one of the half bodies of a housing is omitted.

FIGS. 1 through 5 show a first embodiment of the present invention. A planetary gear device A of this embodiment chiefly comprises, as shown in FIGS. 1 and 2, a housing 1, a carrier 2, planetary gears 3, an inner gear 4, an output cylinder 5 and a sun gear 6.

The housing 1 includes a cylindrical body 1A and a closure body 1B. The cylindrical body 1A has a cylindrical configuration with a bottom. A bottom portion 1a has a support hole 1b of the cylindrical body 1A, which is a through hole, formed in a central area thereof. The closure body 1B is fitted to an opening portion of the cylindrical body 1A in order to close the opening portion and fixed there by bolts B1. The closure body 1B has a support hole 1c formed in a central area thereof with its axis aligned with that of the support hole 1b. A journal portion (not shown) of a differential gear device case is rotatably fitted to the support holes 1b, 1c. By this, the housing 1 is rotatably supported about its rotation axis L (which is aligned with the axes of the support holes 1b, 1c).

Figure 4:
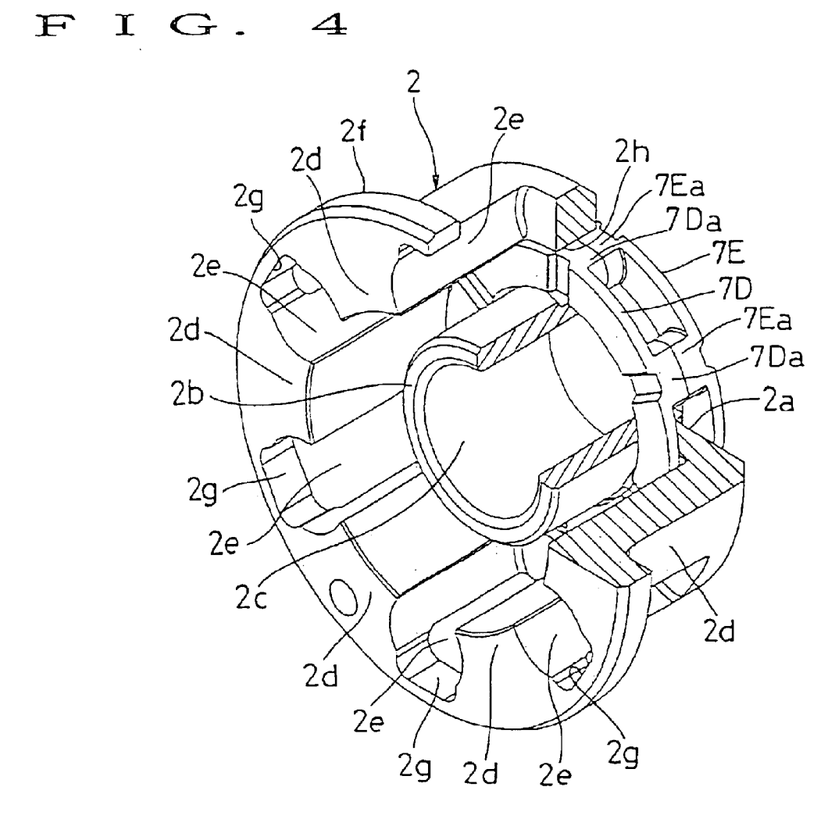
FIG. 4 is a perspective view, partly cut-away, showing a carrier used in the above embodiment.

The carrier 2 is received in the housing 1. The carrier 2 includes, as shown in FIGS. 2 and 4, a ring-like basal portion 2a whose axis is aligned with the rotation axis L. An input cylindrical portion 2b is formed on an inner peripheral portion of the basal portion 2a. Most part of the input cylindrical portion 2b extends from the basal portion 2a to the support hole 1b side. A spline hole 2c is formed in an inner peripheral surface of the input cylindrical portion 2b with its axis aligned with the rotation axis L. One end portion of an input shaft (not shown) inserted into the housing 1 through the support hole 1b is non-rotatably fitted to this spline hole 2c. The other end portion of the input shaft is connected to an engine (not shown) through a transmission (not shown). Accordingly, the carrier 2 is driven for rotation about the rotation axis L by the engine.

A plurality (six in this embodiment) of retaining protrusions 2d are formed on an outer periphery side of one end face (left end face in FIG. 2) of the basal portion 2a. Each retaining protrusion 2d extends in parallel with the rotation axis L towards the bottom portion 1a side. The retaining protrusions 2d are equally spacedly arranged on a circumference about the rotation axis L in the circumferential direction. A distal end face of each retaining protrusion 2d is abutted with the bottom portion 1a of the housing 1. Two or more (two in this embodiment) of all the retaining protrusions 2d are fixed to the bottom portion 1a by bolts B2. Accordingly, the housing 1 and the carrier 2 are rotated in unison with each other.

A receiving portion 2e, as a space for receiving therein a planetary gear 3 as later described, is formed between adjacent two retaining protrusions 2d, 2d in the circumferential direction. The receiving portion 2e is open at a distal end side of the retaining protrusion 2d and is released at an outer periphery side as well as an inner periphery side thereof. A side surface of the retaining protrusion 2d facing the receiving portion 2e, in other words, a side surface of the retaining protrusion 2d defining the receiving portion 2e, is formed by a part of a circular cylindrical surface about a center which is located generally at a center of the two retaining protrusions 2d, 2d which are adjacent to each other in the circumferential direction. An inside diameter of this circular cylindrical surface is set to be larger than a thickness (thickness in a direction orthogonal to the rotation axis L) of the retaining protrusion 2d.

The retaining protrusions 2d and the receiving portions 2e are formed in the following manner, for example. A cylindrical portion about the rotation axis L is preliminarily formed at one end face of the basal portion 2a of the carrier 2. An outside diameter and an inside diameter of the cylindrical portion are dimensioned to be identical with an outside diameter of an arcuate surface which is formed by connecting the outer peripheral surfaces of the retaining protrusions 2d and an inside diameter of an arcuate surface which is formed by connecting the inner peripheral surfaces thereof, respectively. Then, a plurality of holes extending in parallel with the rotation axis L from a distal end face of the cylindrical portion towards the basal portion 2a, are equally spacedly formed in a circumferential direction of the cylindrical portion. The center of each hole is located in an intermediate position between the outer peripheral surface and the inner peripheral surface of the cylindrical portion. The inside diameter of each hole is dimensioned to be identical with the inside diameter of the circular cylindrical surface which defines the receiving portion 2e. The depth of each hole is identical with the length of the receiving portion 2e. Since the inside diameter of each hole is larger than the radial thickness of the cylindrical portion, opposite side portions of the hole on the outer periphery side and the inner periphery side of the cylindrical portion is released from the outer and the inner peripheral surface of the cylindrical portion, respectively. As a result, the cylindrical portion is cut into a plurality of parts in the circumferential direction by such holes. The respective cut parts serve as the retaining protrusions 2d and the respective holes serve as the receiving portions 2e.

A planetary gear 3 is received in each receiving portion 2e such that the planetary gear 3 can rotate about its own axis. The planetary gear 3 can be inserted into the receiving portion 2e through the opening portion of the receiving portion 2e on the distal end side of the retaining protrusion 2d. An outside diameter of the planetary gear 3 is set to be generally equal to the inside diameter of the circular cylindrical surface which defines the receiving portion 2e. A length of the planetary gear 3 is set to be generally equal to a length of the receiving portion 2e. Accordingly, one end face (right end face in FIG. 2) of the planetary gear 3 is in contact with the basal portion 2a of the carrier 2, and the other end face of the planetary gear 3 is in contact with the bottom portion 1a of the housing 1.

A connection portion 2f is formed at an outer peripheral surface of the distal end portion of each retaining protrusion 2d. This connection portion 2f is annularly extended about the rotation axis L and adapted to connect the respective retaining protrusions 2d. By this, each retaining protrusion 2d is enhanced in strength with respect to the circumferential direction and the radial direction about the rotation axis L. An escape portion 2g designed for avoiding the interference of the planetary gear 3 is formed at an inner peripheral surface of the connection portion 2f facing the receiving portion 2e.

An inner gear 4 is received within the housing 1 with its axis is aligned with the rotation axis L. This inner gear 4 includes a gear portion 4a disposed in an annular space formed between the inner peripheral surface of the housing 1 and the outer peripheral surfaces of the basal portion 2a and the retaining protrusion 2d of the carrier 2, and a ring-like connection plate portion 4b integral with one end portion (right end portion in FIG. 2) of the gear portion 4a. The gear portion 4a is in meshing engagement with the respective planetary gears 3. A spline hole 4c is formed in an inner peripheral surface of the connection plate portion 4b. An output cylinder 5 having a circular cylindrical configuration, which is rotatably disposed within the housing 1 about the rotation axis L, is non-rotatably fitted to the spline hole 4c. A spline hole 5a is formed in a central portion of the output cylinder 5 such that the axis of the spline hole 5a is aligned with the rotation axis L. One end portion of an output shaft (not shown) inserted into the housing 1 through the support hole 1c, is non-rotatably fitted to the spline hole 5a. Accordingly, when the inner gear 4 rotates, the output shaft is caused to rotate through the output cylinder 5.

Within the housing 1, the sun gear 6 having a circular cylindrical configuration is rotatably disposed in an annular space formed between the input cylindrical portion 2b and the retaining protrusion portion 2d of the carrier 2 such that the axis of the sun gear 6 is aligned with the rotation axis L. The sun gear 6 is in meshing engagement with the respective planetary gears 3. A spline hole 6a is formed in an inner peripheral surface of the sun gear 6. One end portion of an output shaft (not shown) inserted in the housing 1 through the support hole 1b is non-rotatably fitted to the spline hole 6a. This output shaft actually has a cylindrical configuration. The input shaft is pierced into the output shaft.

The planetary gear 3, the inner gear 4 and the sun gear 6 include twisted teeth. Accordingly, a thrust force acts on the respective gears 3, 4, 6 at the time of operation of the planetary gear device A. By this thrust force, end faces of the respective gears 3, 4, 6 are press contacted with a member(s) opposing thereto. Accordingly, at the time of differential rotation, the end faces of the respective gears 3, 4, 6 are slidingly contacted with the member(s) opposing thereto and therefore, a friction heat is generated at the mutually slidingly contacted faces. In order to prevent the respective slidingly moving faces from being seized by the friction heat and in order to control a torque bias ratio as a ratio of the magnitude of torque transmitted to two output shafts at the time of differential rotation using this thrust force, friction washers 7A, 7B, 7C are disposed between opposing surfaces of the bottom portion 1a of the housing 1 and the sun gear 6, between opposing surfaces of the basal portion 2a of the carrier 2 and the connection plate portion 4b of the inner gear 4 and between opposing surfaces of the connection plate portion 4b and the closure body 1B, respectively.

Figure 5:
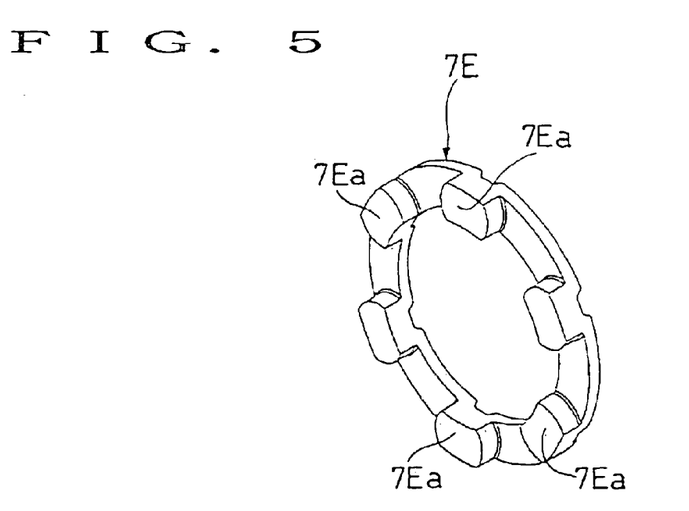
FIG. 5 is a perspective view showing a friction washer used in the above embodiment.

Similarly, friction washers, 7D, 7E, 7F are disposed between opposing surfaces of the sun gear 6 and the basal portion 2a of the carrier 2, between surfaces of the basal portion 2a and the output cylinder 5, and between opposing surfaces of the output cylinder 5 and the closure body 1B, respectively. The friction washers 7D, 7E each have a ring-like configuration. A plurality of projections 7Da, 7Ea are formed on mutually opposing end faces of the friction washers 7D, 7E such that the projections 7Da, 7Ea are located away from each other in the circumferential direction. The respective projections 7Da, 7Ea are inserted in a through hole 2h formed in the basal portion 2a of the carrier 2. The length of the respective projections 7Da, 7Ea in the circumferential direction is dimensioned to be generally equal to the length of the through hole 2h in the circumferential direction. Accordingly, the respective friction washers 7D, 7E are rotated in unison with the carrier 2. The height of the respective projections 7Da, 7Ea is set to be slightly larger than a half of the thickness of the basal portion 2a. Accordingly, the respective friction washers 7D, 7E are never contacted with the end face of the basal portion 2a, and the projections 7Da, 7Ea are contacted with each other. Thus, when a thrust force towards the friction washer 7D side acts on the sun gear 6, the sun gear 6 is abutted with the friction washer 7D, the friction washer 7E is abutted with the output cylinder 5, and the output cylinder 5 is abutted with the closure body 1B through the friction washer 7F. Thus, when the planetary gear device A is differentially rotated, a friction resistance is generated in the respective members, i.e., the sun gear 6, the inner gear 4 and the output cylinder 5 which rotate relative to the respective washers 7A through 7F while contacting therewith, thereby a comparatively large bias ratio can be obtained.

In the planetary gear device A thus constructed, when the carrier 2 is driven for rotation, the rotation is transmitted to the inner gear 4 and the sun gear 6 through the planetary gears 3 and further to the two output shafts. When the planetary gears 3 are not rotated about their own axes, the two output shafts are rotated at the same speed. When the planetary gears are rotated about their own axes, one output shaft is rotated at a high speed and the other shaft is rotated at a low speed.

When the planetary gears 3 are rotated about their own axes, force directing in the radial direction and in the circumferential direction about the rotation axis L acts on the planetary gears 3. This force is received by the respective retaining protrusions 2d. However, since the respective retaining protrusions 2d are connected to each other through the connection portion 2f, they have a sufficient rigidity against the force acting in the radial direction. Moreover, the respective retaining protrusions 2d are connected to each other in the circumferential direction, thereby they are mutually reinforced in the circumferential direction. Accordingly, the amount of deformation of the retaining protrusions 2d caused by the force acting on the planetary gears 3 is greatly reduced. Since the amount of deformation of each retaining protrusion 2d is greatly reduced, an amount of deformation of each receiving portion 2e is also greatly reduced. Thus, the planetary gears 3 can smoothly rotate. This follows that the entire planetary gear device A can smoothly rotate.

Moreover, according to the planetary gear device A thus constructed, the end faces of the planetary gears 3 and the bottom portion 1a can be prevented from being worn out quickly. That is, presuming that the housing 1 and the carrier 2 are rotated relative to each other at the time of differential rotation, the left side end face, in FIG. 2, of the planetary gear 3 is rotated about its own axis and revolved about the rotation axis L while being kept in contact with the bottom portion 1a. For this reason, the left side end face of the planetary gear 3 is slidingly contacted with the bottom portion 1a in a state which is similar to a state in which an end face is ground by a rotary grinder. For this reason, the end face of the planetary gear 3 and the bottom portion 1a are worn out quickly. However, in this planetary gear device A, since the housing 1 rotates in unison with the carrier 2, the planetary gear 3 merely rotates with respect to the bottom portion 1a and never revolves. Accordingly, the planetary gear 3 and the bottom portion 1a can be prevented from being worn out quickly.

Figure 6:
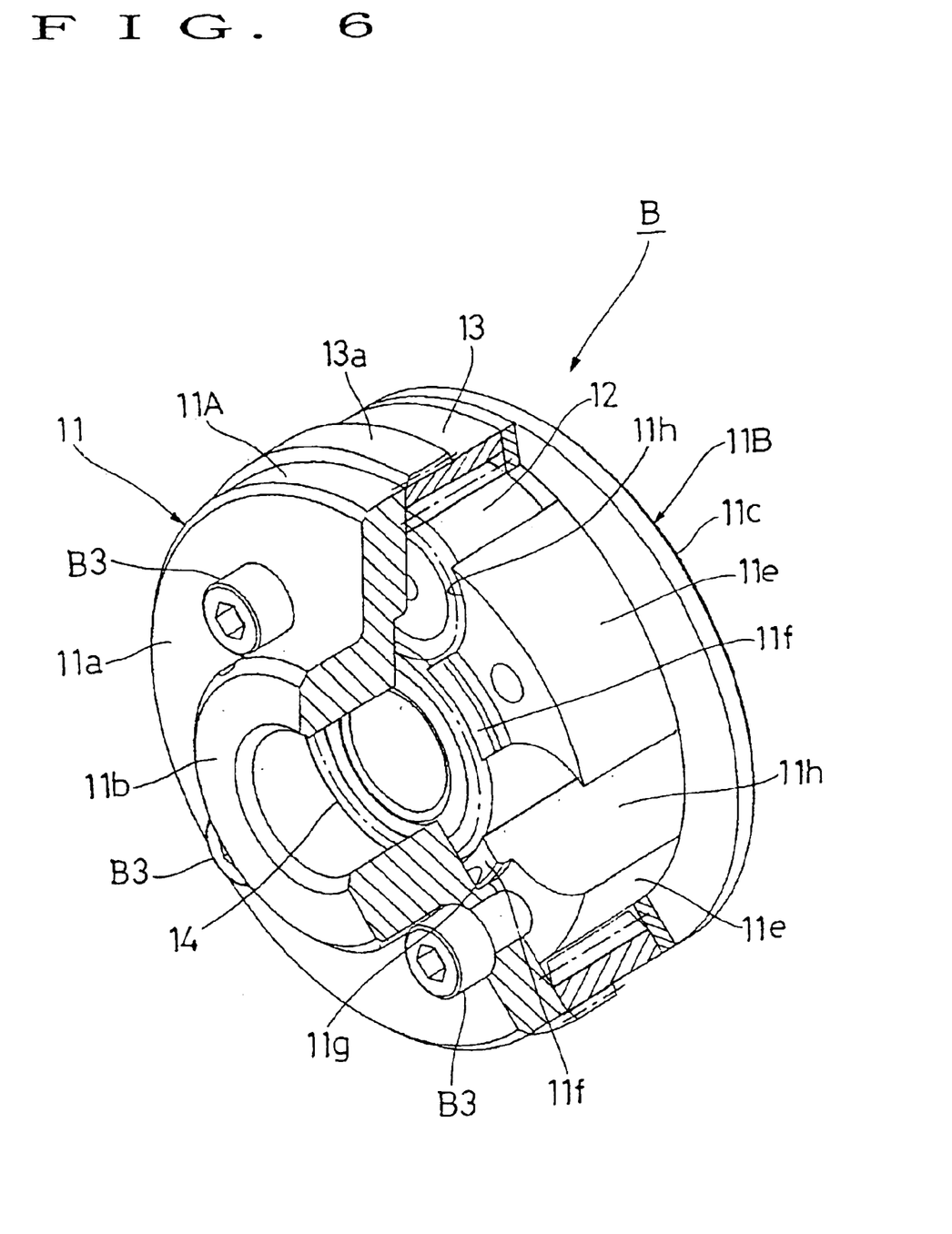
FIG. 6 is a perspective view, partly cut-away, showing a second embodiment of the present invention.
Figure 7:
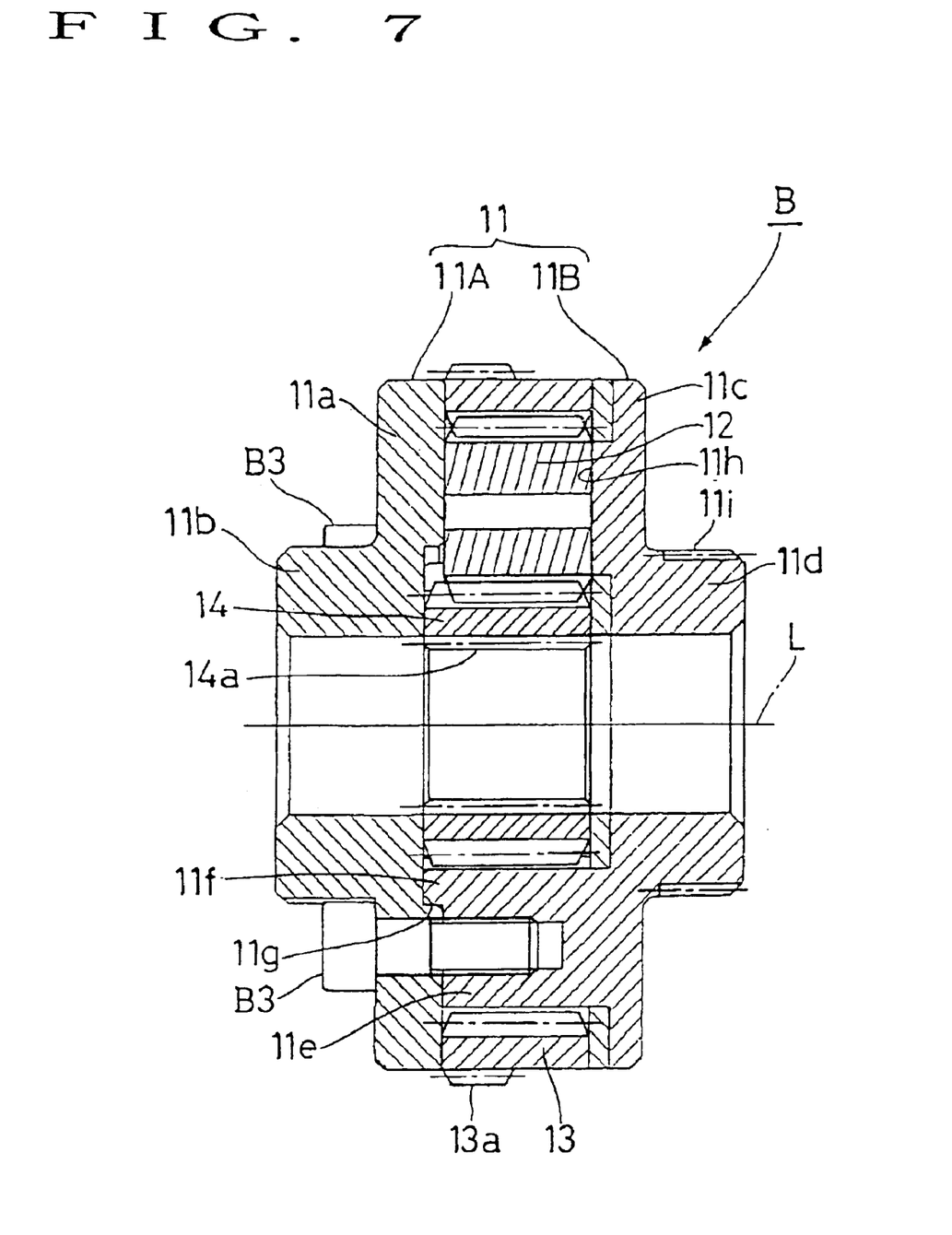
FIG. 7 is a vertical sectional view of the above embodiment.

FIGS. 6 and 7 show a second embodiment of the present invention. In a planetary gear device B of this second embodiment, reference numeral 11 denotes a housing. This housing 11 includes a pair of half bodies 11A, 11B which are arranged in opposing relation with their axes aligned with a rotation axis L. The half body (connection member) 11A includes a disc portion 11a and a circular cylindrical portion 11b which is formed at an end face of the disc portion 11a on the reverse side of the half body 11B side. The other half body (carrier) 11B likewise includes a disc portion (basal portion) 11c and a circular cylindrical portion 11d.

A plurality of retaining protrusions 11e extending in parallel with the rotation axis L are formed on a surface of the disc portion 11c opposing the half body 11A. The respective retaining protrusions 11e are arranged on a circumference about the rotation axis L in such a manner as to be away from each other. A distal end face of each retaining protrusion 11e is abutted with the disc portion 11a of the half body 11A. By tightening bolts B which are threadingly engaged with the respective retaining protrusions 11e through the disc portion 11a, the respective retaining protrusions 11e are fixedly connected to the disc portion 11a. By this, the respective retaining protrusions 11e are reinforced and the half bodies 11A, 11B are fixedly connected to each other.

engagement protrusion 11f extending in the circumferential direction about the rotation axis L is formed on an inner periphery side of a distal end face of each retaining protrusion 11e. On the other hand, a recess 11g extending annularly about the rotation axis L is formed on an end face of the disc portion 11a of the half body 11A opposing the retaining protrusion 11e. An engagement protrusion 11f is fitted to this recess 11g. By this, the retaining protrusion 11e is prevented from being deformed such that a distal end portion of the retaining protrusion 11e proceeds radially outwardly of a circle about the rotation axis L.

A receiving portion 11h is formed between two retaining protrusions 11e, 11e which are adjacent to each other in the circumferential direction. One each of the planetary gears 12 is received in each receiving portion 11h such that the planetary gear 12 can rotate about its own axis. Opposite end faces of the planetary gear 12 are in contact with mutually opposing end faces of the disc portions 11a, 11c of the pair of half bodies 11A, 11B. Accordingly, when the planetary gear 12 rotates about its own axis, its opposite end faces are slidingly contacted with the end faces of the pair of half bodies 11A, 11B. However, the planetary gear 12 never revolves above the rotation axis L relative to the half bodies 11A, 11B. The planetary gear 12 revolves in unison with those half bodies 11A, 11B. Accordingly, the opposite end faces of the planetary gear 12 and the disc portions 11a, 11c are not worn out quickly.

Between the pair of half bodies 11A, 11B, the inner gear 13 is disposed at the outside of the planetary gear 12 and the sun gear 14 is disposed at the inside of the planetary gear 12. Of course, the inner gear 13 and the sun gear 14 are disposed with their axes aligned to each other, and they are in meshing engagement with the planetary gears 12.

Spline portions 11i, 13a, 14a are formed on an outer peripheral surface of a circular cylindrical portion 11d of the half body 11B, an outer peripheral surface of the inner gear 13 and an inner peripheral surface of the sun gear 14, respectively. An input member is non-rotatably connected to one of those three spline portions 11i, 13a, 14a, and two output members are non-rotatably connected to the remaining two, respectively. Usually, the input member is connected to the spline portion 11i and the housing 11 is driven for rotation.

In the planetary gear device thus constructed, since the retaining protrusion 11f is fitted to the recess 11g, the half body 11A prevents the retaining protrusion 11e from being deformed radially outwardly of the circle drawn about the rotation axis L. Accordingly, the planetary gear 12 can be rotated more smooth to that extent compared with the conventional planetary gear device.

Moreover, since the half body 11A is fixed to the distal end faces of the respective retaining protrusions 11e, the retaining protrusions 11e are not only deformed radially outwardly but also hardly deformed radially inwardly as well as in the circumferential direction. Accordingly, the planetary gears can more smoothly be rotated. Thus, if the half body 11A is fixed to the distal end faces (distal end portions) of the respective retaining protrusions 11e to thereby connect the respective retaining protrusions together, the engagement protrusions 11f and the recesses may be eliminated. In contrast, if the engagement protrusions 11f and the recesses 11g are employed for fitting engagement, the half body 11A is not required to be fixed to the respective retaining protrusions 11e. Moreover, since the half body 11A revolves together with the planetary gears 12, the contact surfaces of the planetary gears with respect to the half body 11A are not worn out quickly.

Figure 8:
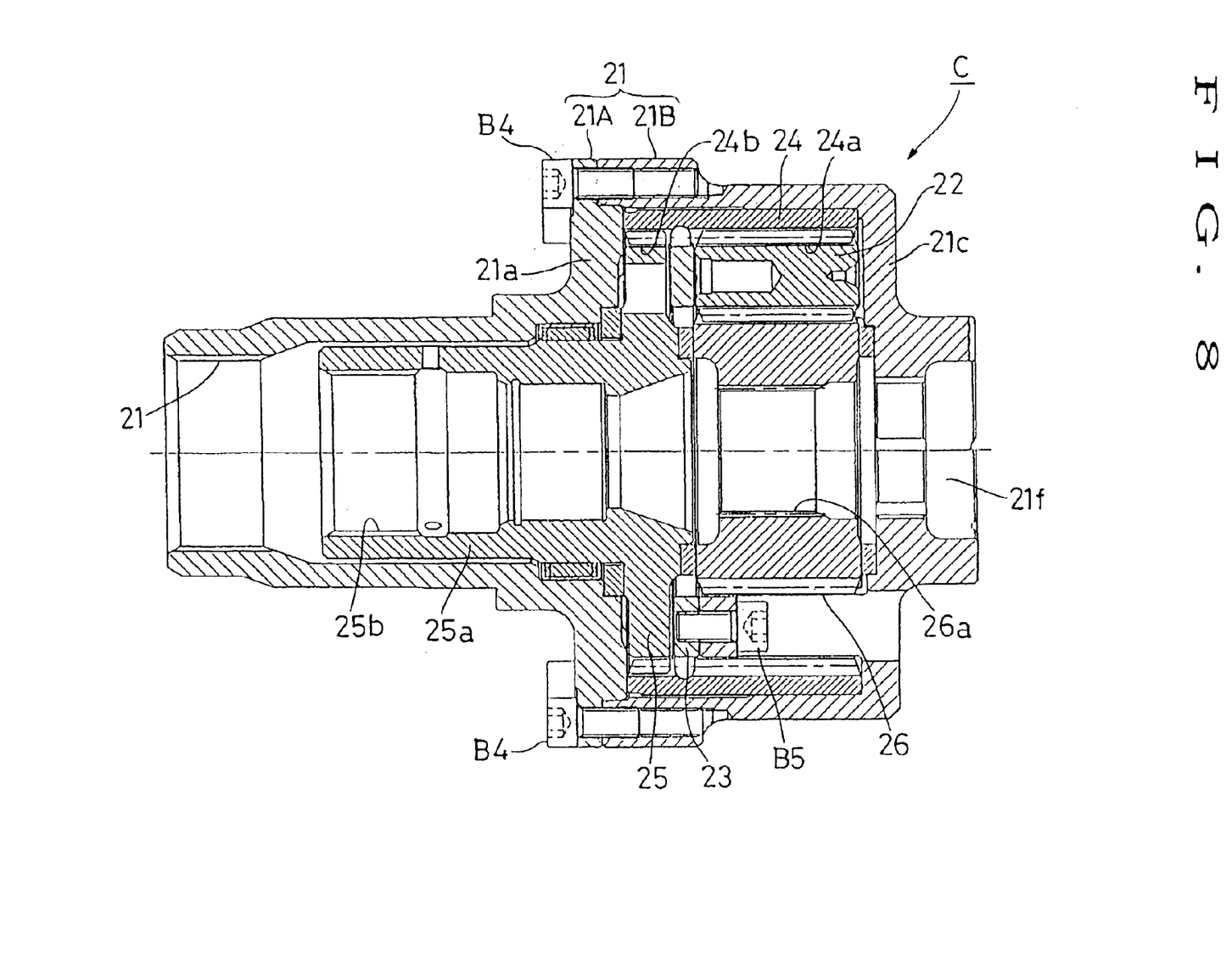
FIG. 8 is a vertical sectional view showing a third embodiment of the present invention.
Figure 9:
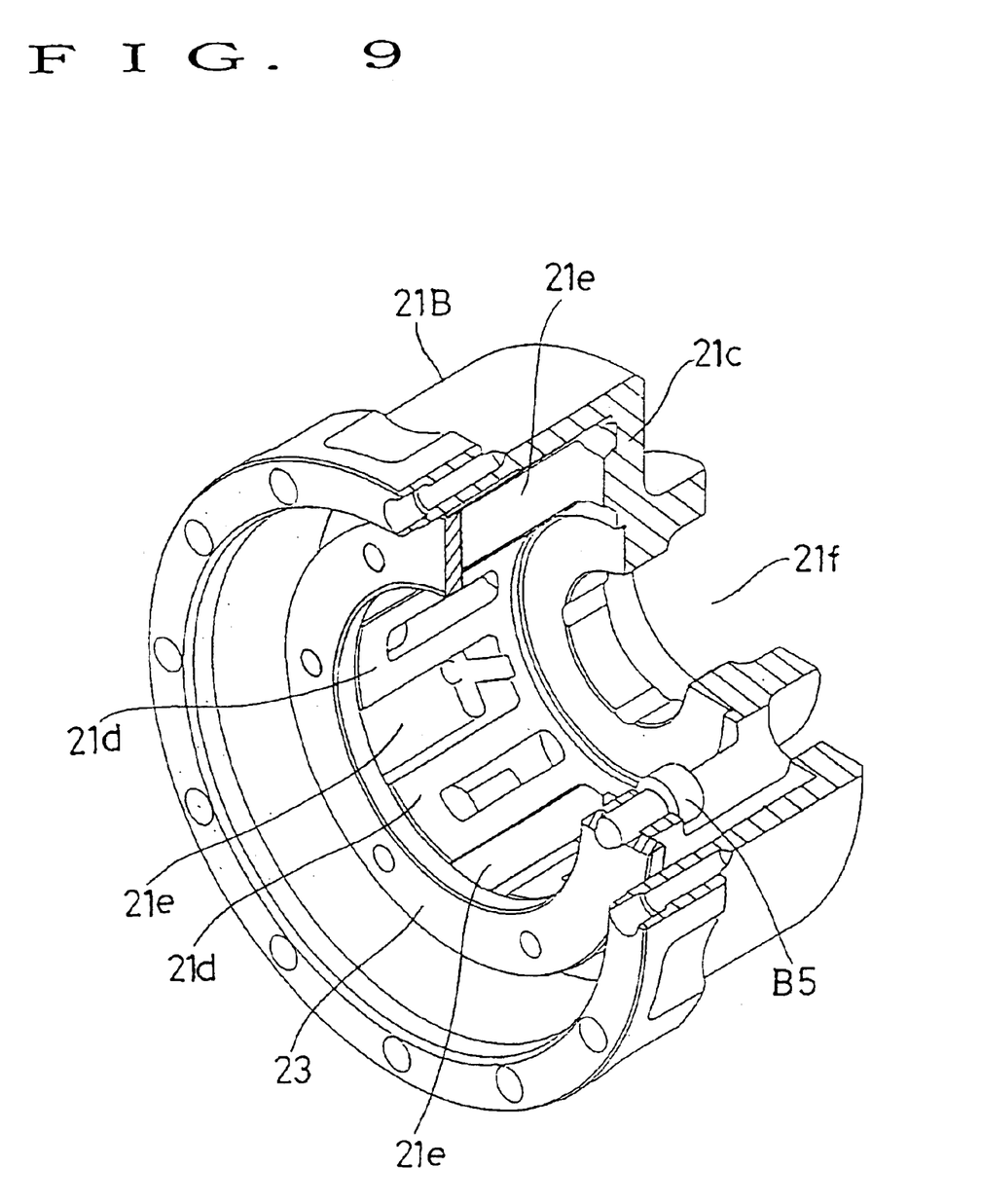
FIG. 9 is a perspective view, partly-cutaway, showing one of the half bodies of a housing and a connection member used in the above embodiment.
Figure 10:
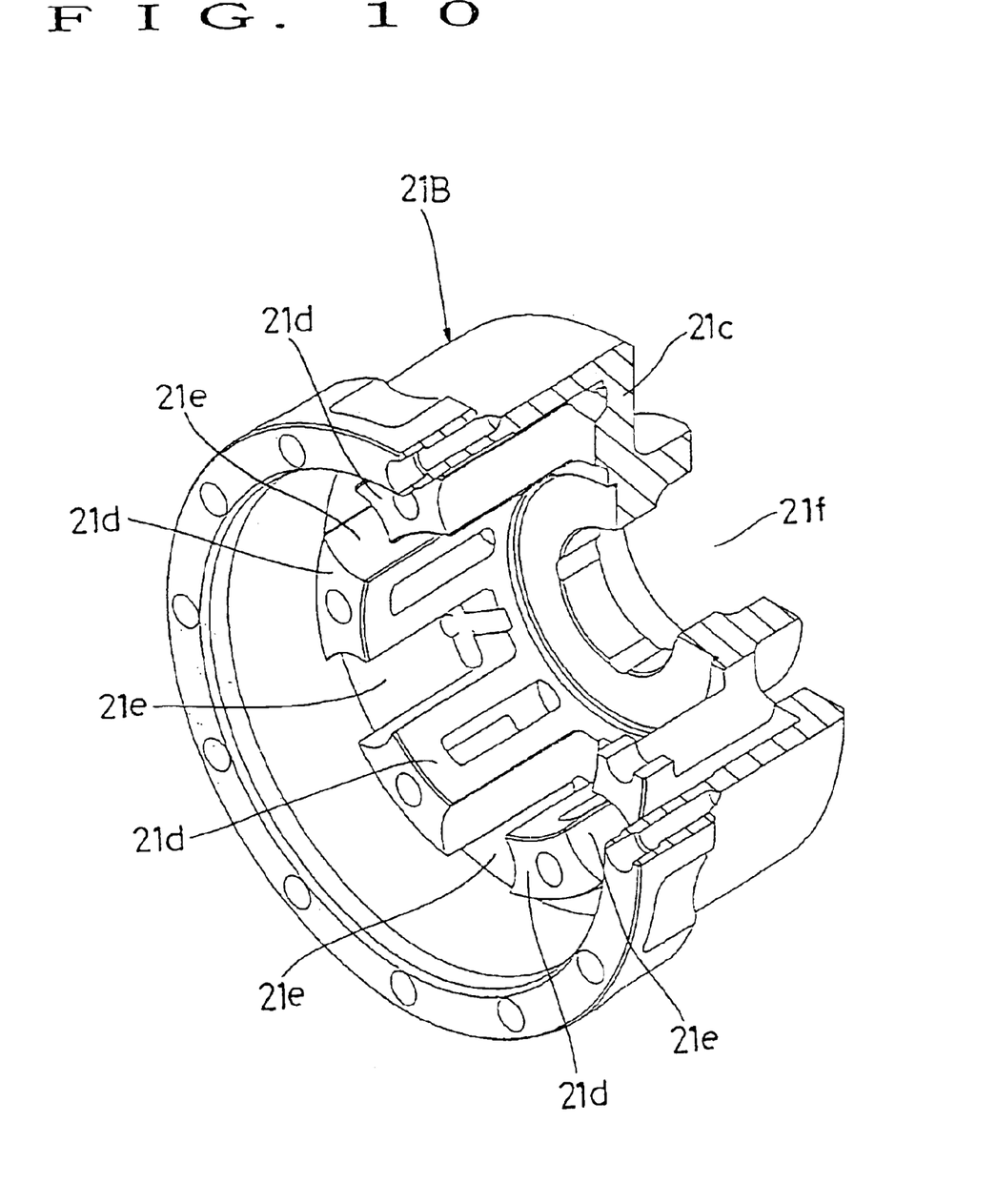
FIG. 10 is a perspective view, partly cut-away, showing the other half body used in the above embodiment.

FIGS. 8 through 10 show a third embodiment of the present invention. Also in a planetary gear device C of this third embodiment, the housing 21 comprises two half bodies 21A, 21B. The half body 21A has a circular cylindrical configuration. The half body 21A is disposed with its axis aligned with a rotation axis L. A disc-like flange portion 21a is formed on an end portion of the half body 21A on the half body 21B side. The other half body (carrier) 21B has a circular cylindrical configuration with a bottom. This half body 21B is fixed by a bolt B4 with its end face on an opening portion side abutted with the flange portion 21a of the half body 21A. By this, the two half bodies 21A, 21B are integrated into a unitary body. A spline hole portion 21b is formed in an end portion of an inner peripheral surface of the half body 21A on a reverse side of the half body 21B side. A cylindrical input shaft (not shown) is non-rotatably fitted to this spline hole portion 21b. By this input shaft, the housing 21 is driven for rotation about the rotation axis L.

A plurality (six in this embodiment) of retaining protrusions 21d extending in parallel with the rotation axis L are formed on an inner end face of a bottom portion (basal portion) 21c of the half body 21B. The respective retaining protrusions 21d are equally spacedly arranged on a circumference about the rotation axis L in a circumferential direction. A receiving portion 21e is formed between two retaining protrusions 21d, 21d which are adjacent to each other in the circumferential direction. A planetary gear 22 is received in this receiving portion 21e such that the planetary gear 22 can rotate on its own axis.

A ring-like connection member 23 is abutted with a distal end face of each retaining protrusion 21d. This connection member 23 is disposed with its axis aligned with the rotation axis L and fixed to a distal end face of each retaining protrusion 21d by a bolt B5. By this, the respective retaining protrusions 21d are connected to each other through the connection member 23. Accordingly, deformation of the retaining protrusions is greatly reduced.

An inner gear 24 is rotatably disposed in an annular gap formed between an inner peripheral surface of the half body 21B and a plurality of retaining protrusions 21c with an axis of the inner gear 24 aligned with the rotation axis L. A gear portion 24a is formed on a large part of an inner peripheral surface of the inner gear 24 only excluding one end portion thereof in its axial direction. This gear portion 24a is in meshing engagement with the planetary gears 22. A spline hole portion 24b is formed in one end portion of the inner peripheral surface of the inner gear 24. This spline hole portion 24b is preferably formed with the same gear specifications as the gear portion 24a. By doing so, the spline hole portion 24b and the gear portion 24a can be machined simultaneously.

An output member 25 is non-rotatably fitted to the spline hole portion 24b. This output member 25 includes a support cylindrical portion 25a extending towards the spline hole portion 21b side within the half body 21A. This support cylindrical portion 25a is rotatably supported on an inner peripheral surface of the half body 21A with its axis aligned with the rotation axis L. A spline hole portion 25b is formed in an end portion of an inner peripheral surface of the support cylindrical portion 25a on the spline hole portion 21b side. An output shaft (not shown) inserted into the input shaft is non-rotatably fitted to the spline hole portion 25b.

A circular cylindrical sun gear 26 is rotatably disposed in a space surrounded by a plurality of retaining protrusions 21d with its axis aligned with the rotation axis L. This sun gear 26 is in meshing engagement with the planetary gears 22. A spline hole portion 26a is formed in an inner peripheral surface of the sun gear 26. One end portion of an output shaft (not shown) extending through an insertion hole 21f extending through a central portion of a bottom portion 21c of the half body 21B, is non-rotatably fitted to this spline hole portion 26a.

Also in the planetary gear device of this embodiment, since a plurality of retaining protrusions 21d are connected to each other through the connection portion 23, an amount of deformation of each retaining protrusion 21d in the radial direction and in the circumferential direction of a circle drawn about the rotation axis L is greatly reduced. Accordingly, the planetary gears 22 can smoothly be rotated. Moreover, although the connection member 23 contacts the end face of each planetary gear 22, it revolves together each planetary gear 22. Accordingly, the planetary gears 22 and the connection member 23 are not worn out quickly.

Figure 11:
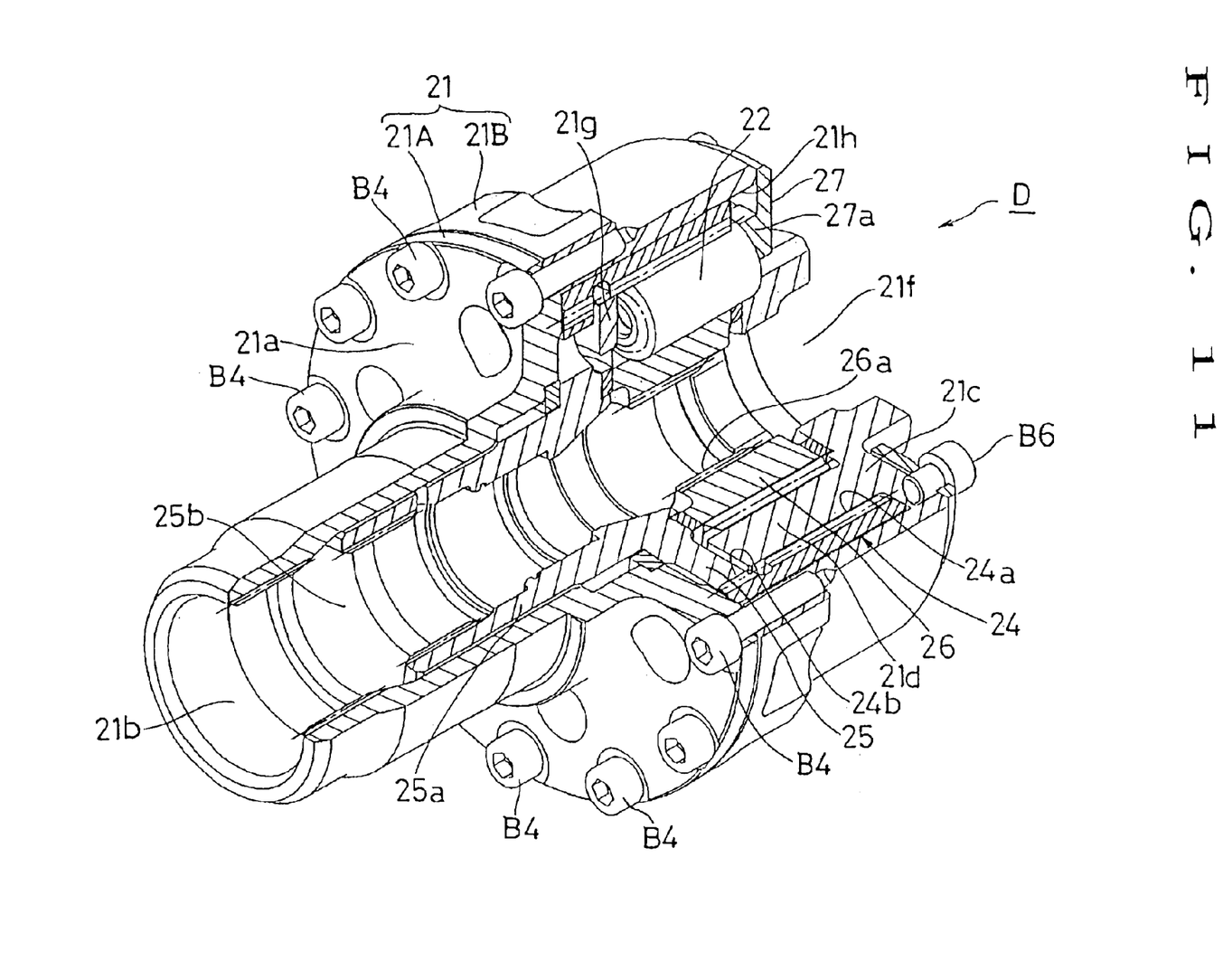
FIG. 11 is a perspective view, partly cut-away, showing a fourth embodiment of the present invention.
Figure 12:
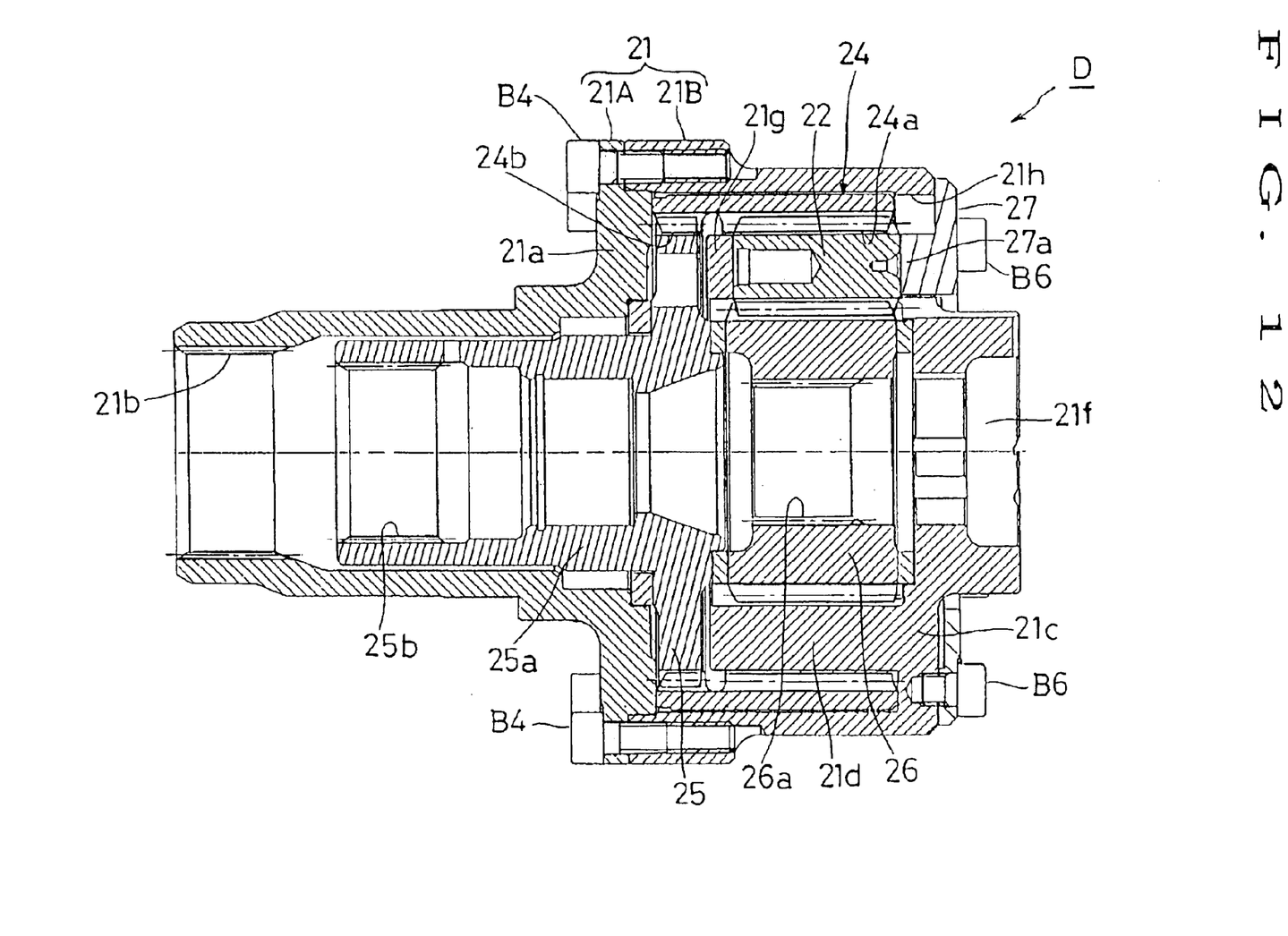
FIG. 12 is a vertical sectional view of the above embodiment.
Figure 13:
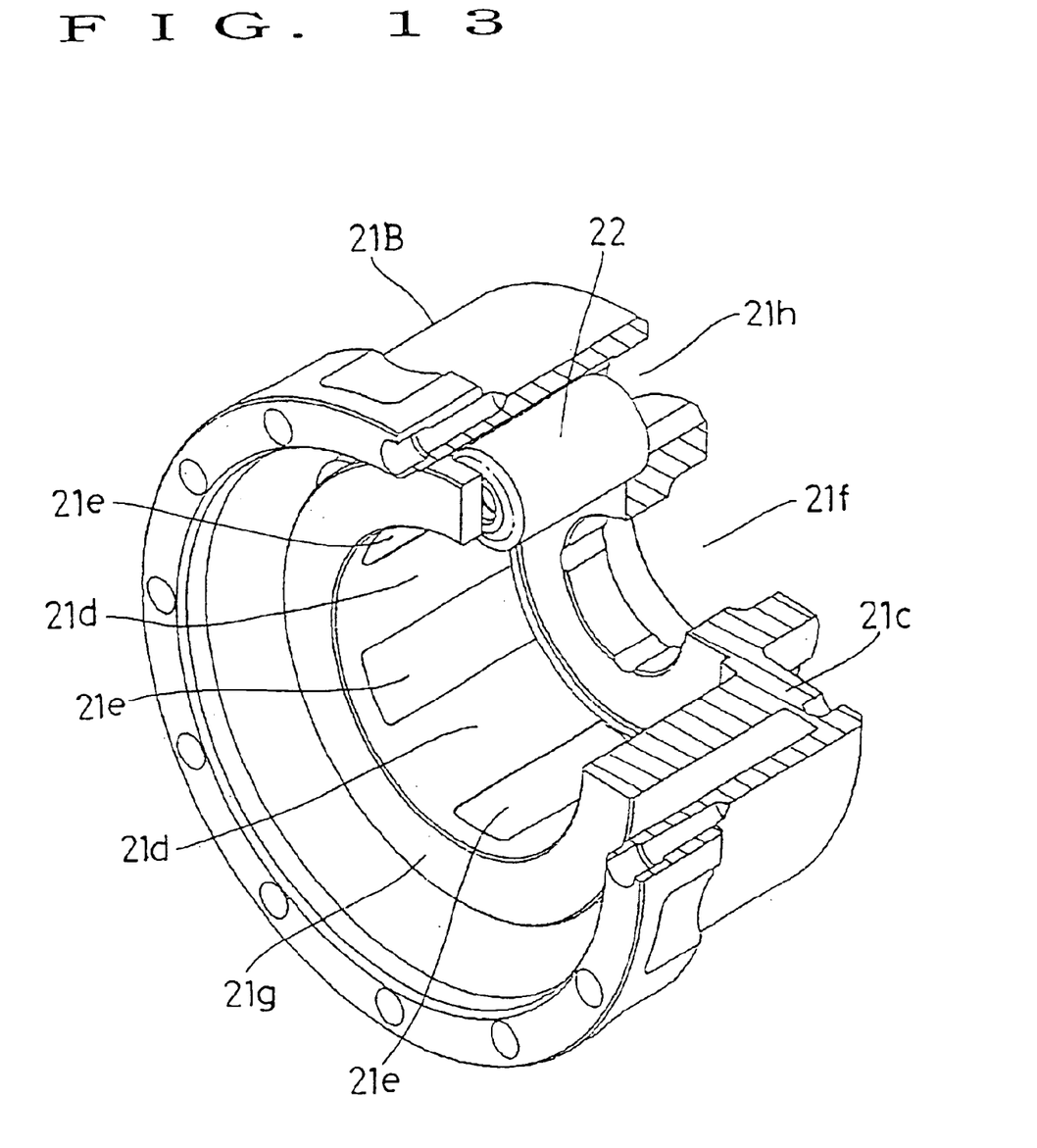
FIG. 13 is a perspective view, partly cut-away, showing one of the half bodies of a housing used in the above embodiment.

FIGS. 11 through 13 shows a fourth embodiment of the present invention. A planetary gear device D of this fourth embodiment is a modification of the above-mentioned planetary gear device C. Therefore, only modified portions are described, like portions as in the planetary gear device C are denoted by like reference numeral and description thereof is omitted.

In the planetary gear device D, the connection member 23 in the planetary gear device C is integrally formed on each retaining protrusion 21d as a connection portion 21g. Accordingly, the receiving portion 21e is not released at a distal end side of the retaining protrusion 21d and a planetary gear 22 cannot be inserted into the receiving portion 21e from the distal end side of the retaining protrusion 21d. Thus, the same number of through holes 21h as the receiving portions 21e are formed in a bottom portion 21c. The through hole 21h forms a part of the receiving portion 21e. The through hole 21h is formed with its axis aligned with that of the receiving portion 21e. An inside diameter of the through hole 21h is dimensioned to be generally equal to or larger than an inside diameter of the receiving portion 21e. Accordingly, the planetary gear 22 can be inserted into the receiving portion 21e through the through hole 21h.

A ring-like presser plate 27 is fixed to an outer end face of the bottom portion 21c by a bolt B6. A protrusion 27a is formed at a place of the presser plate 27 opposing the through hole 21h. This protrusion 27a enters the inside of the through hole 21h and contacts an end face of the planetary gear 22 on the through hole 21h side. By this, the planetary gear 22 is not only prevented from escaping outside through the through hole 21h but also it is almost non-movable in the axial direction.

In the planetary gear device D thus constructed, since the retaining protrusions 21d are connected to each other through the connection portions 21g which are integral with the retaining protrusions 21d, the retaining protrusions 21d are hardly deformed by force acting on the planetary gears 22. Accordingly, the planetary gears 22 can smoothly be rotated. Moreover, since the connection portions 21g and the presser plates 27 which contact the end faces of the planetary gears 22 do not revolve relative to the planetary gears 22 but they revolve together, the planetary gears 22, the connection portions 21g and the presser plates 27 can be prevented from being worn out quickly.

The present invention is not limited to the above-mentioned embodiments but many changes and modifications can be made in accordance with necessity.

For example, in the above embodiments, although only one receiving portion is formed between two retaining protrusions which are adjacent to each other in the circumferential direction and the planetary gear received in the receiving portion is meshed with the inner gear and the sun gear, it is also accepted that a set of receiving portions are formed on an outer periphery side and an inner periphery side between two retaining protrusion which are adjacent to each other in the circumferential direction, the planetary gears which are meshed with each other are received in the respective receiving portions, the planetary gear receiving in the outer periphery side receiving portion is meshed with the inner gear, and the planetary gear receiving in the inner periphery side receiving portion is meshed with the sun gear.

Moreover, in the above-mentioned respective embodiments, although the connection portions 2f, 21g or the connection members 11A, 23 are contacted with the end faces of the respective planetary gears 3, it is also an interesting alternative that the connection portions or the connection members are used only for connecting the retaining protrusions and other members are contacted with the end faces of the planetary gears 3.

What is claimed is:

1. A planetary gear device comprising:
    a carrier rotationally driven about a rotational axis by a rotational force from an engine;
    an inner gear arranged outside of said carrier and rotatable relative thereto about the rotational axis;
    a sun gear arranged inside of said carrier and rotatable relative to thereto about the rotational axis;
    plural retaining protrusions formed in said carrier and extending from a basal portion thereof in a direction of the rotational axis;
    said plural retaining protrusions including walls shaped as parts of cylindrical surfaces formed in adjacent retaining protrusions;
    plural receiving portions respectively formed between said walls of the adjacent retaining protrusions;
    plural planetary gears respectively received between said retaining protrusions, disposed between said inner gear and said sun gear, and rotatable together with said carrier about the rotational axis, each of said plural planetary gears being mounted for rotation about its own rotational axis within one of said receiving portions in contact with said walls of the retaining protrusions and to be gear-engaged with respective of said inner gear and said sun gear; and
    connection portion provided at distal end portions of said retaining protrusions to connect respective of said retaining protrusions to each other, said connection portion being configured to enhance the strength of said retaining protrusions.

2. A planetary gear device according to claim 1, wherein said connection portion is formed on outer peripheral surfaces of the distal end portion of said carrier in union therewith in a radial direction perpendicular to the rotational axis.

3. A planetary gear device according to claim 1, further comprising:
    a housing composed of two half bodies;
    wherein said carrier is composed of one of said two half bodies which is fixed by bolts; and
    wherein the other of said two half bodies is arranged opposing to said one of two half bodies, and is fixed into the distal end portions of said retaining protrusions by bolts to rotate with said one of two half bodies.

4. A planetary gear device according to claim 1, wherein said connection portion is composed of a ring-like connection member that is separately formed relative to said retaining protrusion, and is fixed at distal end faces of said retaining protrusions by bolts in an axial direction of the rotational axis, said ring-like connection member being configured to be rotated with said carrier.

5. A planetary gear device according to claim 1, wherein said connection portion is formed on distal end faces of the distal end portion of said carrier integrally therewith circumferentially around the rotational axis.

6. A planetary gear device according to claim 5, wherein said receiving portion penetrates the basal portion of said carrier and extends to said connection member.

7. A planetary gear device according to claim 6, further comprising:
    a housing composed of at least two half bodies;
    wherein said carrier is formed by one of said two half bodies and a plate is fixed onto said basal portion of said carrier by bolts; and
    wherein the other of said two half bodies is arranged opposing to said one of said two half bodies, and is fixed thereto by bolts to rotate therewith.

* * * * *